US012748324B2

(12) United States Patent
Yin et al.

(10) Patent No.: US 12,748,324 B2
(45) Date of Patent: Sep. 29, 2026

(54) METHOD AND SYSTEM FOR MULTICOLOR PHOTONIC PIGMENTS FROM MAGNETICIALLY ASSEMBLED NANOROD ARRAYS

(71) Applicant: THE REGENTS OF THE UNIVERSITY OF CALIFORNIA, Oakland, CA (US)

(72) Inventors: Yadong Yin, Riverside, CA (US); Zhiwei Li, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 831 days.

(21) Appl. No.: 18/182,596

(22) Filed: Mar. 13, 2023

(65) Prior Publication Data

US 2023/0305322 A1 Sep. 28, 2023

Related U.S. Application Data

(60) Provisional application No. 63/319,574, filed on Mar. 14, 2022.

(51) Int. Cl.

| | |
|---|---|
| ***G02F 1/00*** | (2006.01) |
| ***C09C 1/24*** | (2006.01) |
| ***C09C 3/00*** | (2006.01) |
| ***C09C 3/06*** | (2006.01) |
| ***C09C 3/10*** | (2006.01) |

(52) U.S. Cl.

CPC .............. *G02F 1/0054* (2013.01); *C09C 1/24* (2013.01); *C09C 3/006* (2013.01); *C09C 3/063* (2013.01); *C09C 3/10* (2013.01); *G02F 1/0036* (2013.01); *C01P 2002/77* (2013.01); *C01P 2004/02* (2013.01); *C01P 2004/03* (2013.01); *C01P 2004/04* (2013.01); *C01P 2004/16* (2013.01); *C01P 2004/84* (2013.01); *C01P 2006/42* (2013.01); *G02F 2202/32* (2013.01); *G02F 2202/36* (2013.01)

(58) Field of Classification Search

CPC .. G02F 1/0036; G02F 1/0054; G02F 2202/32; G02F 2202/36; C09C 1/24; C09C 3/006; C09C 3/063; C09C 3/10; C01P 2002/77; C01P 2004/02; C01P 2004/03; C01P 2004/04; C01P 2004/16; C01P 2004/84; C01P 2006/42

See application file for complete search history.

(56) References Cited

PUBLICATIONS

Zhiwei Li, Chang Qian, Wenjing Xu, Chenhui Zhu, Yadong Yin, Coupling morphological and magnetic anisotropy for assembling tetragonal colloidal crystals, Sci. Adv. 2021; 7: 1-8,. (Year: 2021).*

Liu Bao, Wai-Leong Low, Jiang Jiang and Jackie Y. Ying, Colloidal synthesis of magnetic nanorods with tunable aspect ratios, J. Mater. Chem., 2012, 22, 7117-7120. (Year: 2012).*

Bai et al., "Surface-Initiated Redox Route to Hollow MnO2 Nanostructures", ChemNanoMat, (Aug. 2020), vol. 6, Issue 8, pp. 1186-1190.

(Continued)

*Primary Examiner* — Bijan Ahvazi

(74) *Attorney, Agent, or Firm* — Buchanan Ingersoll & Rooney PC

(57) ABSTRACT

Photonic pigments are disclosed, which include a plurality of magnetic nanorods assembled into tetragonal colloidal crystals.

14 Claims, 9 Drawing Sheets

(56) References Cited

PUBLICATIONS

Bao et al., "Colloidal Synthesis of Magnetic Nanorods with Tunable Aspect Ratios", Journal of Materials Chemistry, (Mar. 2012), vol. 22, Issue 15, pp. 7117-7120.
Cordente et al., "Synthesis and Magnetic Properties of Nickel Nanorods", Nano Letters, (Aug. 2001), vol. 1, No. 10, pp. 565-568.
Ge et al., "Assembly of Magnetically Tunable Photonic Crystals in Nonpolar Solvents", Journal of the American Chemical Society, (Feb. 2009), vol. 131, No. 10, pp. 3484-3486.
Li et al., "Magnetically Tunable Plasmon Coupling of Au Nanoshells Enabled by Space-Free Confined Growth", Nano Letters, (Oct. 2020), vol. 20, vol. 11, pp. 8242-8249.
Wetz et al., "Synthesis and Magnetic Properties of Co Nanorod Superlattices", Materials Science and Engineering: C, (Sep. 2007), vol. 27, Issue 5-8, pp. 1162-1166.
Zhang et al., "Synthesis and Characterization of NiFe2O4 Magnetic Nanorods Via a PEG-Assisted Route", Journal of Magnetism and Magnetic Materials, (Apr. 2005), vol. 292, pp. 79-82.

* cited by examiner

METHOD AND SYSTEM FOR MULTICOLOR PHOTONIC PIGMENTS FROM MAGNETICIALLY ASSEMBLED NANOROD ARRAYS

RELATED APPLICATIONS

This application claims priority to U.S. Ser. No. 63/319,574 filed on Mar. 14, 2022, the entire contents of which is incorporated by reference in its entirety.

GOVERNMENT CLAUSE

This invention was made with government support under grant number DMR-1810485 awarded by the U.S. National Science Foundation. The government has certain rights in this invention.

TECHNICAL FIELD

The present disclosure generally relates to a method and system for multicolor photonic pigments from magnetically assembled nanorods arrays.

BACKGROUND

Colloidal crystals are ordered superstructures of colloidal particles whose repeating subunits are much larger than their analogous atomic and molecular crystals. The spatial configuration of matter and surface ligands in colloidal crystals, which control many physical and chemical properties, can be tailored in a nanometer precision by adjusting the subunit composites, sizes, shapes, and crystal structures. Therefore, the colloidal assembly has become an effective strategy in producing many functional materials in photonics, structural materials, robotics, and catalysis. The assembly of either spherical or highly faceted colloids is mainly dominated by entropic processes that involve depletion, hydrophobic forces, and polymer "elasticity," producing densely packed colloidal crystals with close surface contact. Theoretical simulations and colloidal self-assembly at multiscale have demonstrated this common assembly manner.

For exploring more complex superstructures, sole or joint anisotropic interactions have been introduced, including specific binding between biomolecules (particularly DNA), van der Waals forces of ligands, magnetic forces, and electrostatic forces. A few advanced strategies use directed interactions between Janus microparticles for creating emerging superstructures. Among these established methods, the nanoscale magnetic assembly provides precise control over colloidal crystal symmetry and orientation, and the dynamic interplay between magnetic forces and other underlying forces of different length scales may offer great opportunities in creating emerging superstructures and smart materials. One benefit in this regard is the widely accessible range of monodisperse magnetic colloids with defined shapes, tunable properties, and delicate structures. Scientists are achieving even more exquisite control over the synthesis of magnetic particles, including those with various shapes, core/shell nanoparticles, and Janus particles with magnetic patches, setting the stage ready for exploiting their assembly into complex superstructures with remarkable collective properties.

SUMMARY

In accordance with an embodiment, body-centered tetragonal (bct) superstructures with reduced crystal symmetry are disclosed that can be developed by the magnetic assembly of nanorods in colloidal solutions. It has been known since 1269 that opposite magnetic poles attract, favoring dipole-to-dipole end-on attachment. At the nanoscale, however, magnetic nanorods assemble along a size-dependent critical angle. The shape-induced anisotropic interaction generates two attractive domains separated by a magnetically repulsive center domain. It directs nanorods to assemble along the critical axis into bct crystals, rather than the side-on attachment favored in entropy-dominated assembly or end-on attachment favored by magnet opposite pole attraction. It would be desirable to have a system and method that yields bct crystals with tunable lattice constants, tailorable physical properties, readily accessible surfaces, and interconnected nanochannels.

In accordance with an embodiment, photonic pigments are disclosed comprising: a plurality of magnetic nanorods assembled into tetragonal colloidal crystals.

In accordance with another embodiment, a method is disclosed of forming photonic pigments with tunable color responses, the method comprising: assembling a plurality of magnetic nanorods into tetragonal colloidal crystals.

BRIEF DESCRIPTION OF THE DRAWINGS

FIGS. 1A-1I illustrate the magnetic assembly of nanorods into body-centered tetragonal (bct) colloidal crystals, and wherein FIG. 1A is a TEM image of $Fe_3O_4@SiO_2$ nanorods; FIG. 1B is a dark-field optical microscopy image of the needle-like colloidal crystals under an external magnetic field, inset shows a digital photo of a rod dispersion in a vertical magnetic field; in FIG. 1C, left is an optical microscopy image of the colloidal crystals in a colloidal dispersion and middle to right is a low-magnification SEM image showing the fixed needle-like structures and high-magnification SEM image showing the characteristic rod packing on the crystal surfaces; FIG. 1D is a low-magnification TEM image of assembled hollow $SiO_2$ ellipsoids formed by postassembly etching of $Fe_3O_4$ core;

FIGS. 1E-1H are TEM images of the assembled crystals under the projections of different crystal facets; and FIG. 11 is a 3D reddening and ball-stick bond diagram of the bct colloidal crystal and its facets.

FIGS. 2A-2H are structure characterization of bct colloidal crystals, wherein FIG. 2A is a TEM image of the bct crystal showing the projection of (100) facets, positions of rods are identified and mapped to a bct lattice; FIG. 2B is a normalized distribution intensity of nanorods inside the crystals in FIG. 2A along different crystallographic directions; FIG. 2C are schematics of bct crystals under different orientations by rotating along given crystallographic directions; FIGS. 2D and 2E are TEM images showing bct crystals under various orientations by rotating along [001] and [110], respectively; FIG. 2F are simulated bct colloidal crystals; FIG. 2G are TEM images of bct crystals assembled from magnetic nanorods with different sizes and aspect ratios; FIG. 2H illustrates the dependence of lattice constant ratio (c/a) on the aspect ratios (Ars) of magnetic nanorods, inset is the experimental phase diagram showing the magnetic assembly behaviors of rods, and blue, green, and red dots represent linear colloidal chains, bct crystals, and disordered fibers with only orientational orders, respectively; and scale bars in FIGS. 2D, 2E, and 2G are 200 nm.

FIG. 3B is a plot of total force and its normal, tangent components against θ when $SiO_2$ thickness is 50 nm; FIG. 3C illustrates force field of the normal (left half) and tangent (right half) components of the pair interactions between two magnetic nanorods (t=50 nm) by varying separation and angles (θ) between rce and no;

FIG. 3D is a 3D mapping of critical angles ($\phi_c$) for nanorods with different aspect ratios;

FIG. 3E illustrates 3D force fields of magnetic interactions experienced by one nanorod above the 2D assemblies; and FIG. 3F illustrates magnetic potential above the 2D assemblies at certain separations.

FIGS. 4A-4F illustrate assembly kinetics, wherein FIG. 4A is a temporal evolution of SAXS patterns during the in situ measurement of magnetic assembly of nanorods; FIGS. 4B and 4C are representative linear profile of SAXS patterns along the horizontal (FIG. 4B) and vertical (FIG. 4C) directions; FIG. 4D illustrates magnetic assembly kinetics of the bct crystals along the c axis (top) and the a axis (bottom); FIG. 4E illustrates the trajectory of the magnetic nanorods during the assembly process; and FIG. 4F is a depiction of the magnetic assembly and formation of bct crystals.

FIGS. 5A-5E illustrate optical properties of the assembled bct photonic crystals, wherein FIG. 5A is an optical microscopy images of a bct crystal under different orientations; FIG. 5B is a schematic illustration of measuring the crystal optical properties and light was incident along the surface normal, and a horizontal (0°) magnetic field was applied; FIG. 5C are optical microscopy images of the bct crystals under different magnetic field directions: blue at 0°, green at 20°, and red at 45°; FIG. 5D is measured reflection spectra of rod dispersion under different magnetic fields, and increasing the field direction from 0° to 65° leads to a gradual red shift of the reflection peaks, and FIG. 5E are structural colors of rods dispersion under different magnetic fields, and scale bars, 20 μm (FIGS. 5A and 5C) and 5 mm (FIG. 5E).

DETAILED DESCRIPTION

In accordance with one embodiment, morphological and magnetic anisotropy can be combined in colloidal assembly to create unconventional secondary structures. In an embodiment, magnetite nanorods are shown to interact along a critical angle, depending on their aspect ratios and assemble into body-centered tetragonal colloidal crystals. Under a magnetic field, size-dependent attractive and repulsive domains develop on the ends and center of the nanorods, respectively. A joint experiment-computational multiscale study demonstrates the presence of a critical angle in the attractive domain, which defines the equilibrium bonding states of interacting rods and leads to the formation of non-close-packed yet hard-contact tetragonal crystals. Small-angle x-ray scattering measurement attributes the perfect tetragonal phase to the slow assembly kinetics. The crystals exhibit brilliant structural colors, which can be actively tuned by changing the magnetic field direction. These highly ordered frameworks and well-defined three-dimensional nanochannels may offer new opportunities for manipulating nanoscale chemical transformation, mass transportation and wave propagation.

In accordance with an embodiment, FeOOH nanorods (aspect ratios from 3 to 30) were synthesized by hydrolysis of $FeCl_3$ and further reduced to magnetic nanorods after being coated with silica of controllable thickness. In this surface-protected reduction, the silica shell maintains the rod shape during the phase transition of FeOOH to $Fe_3O_4$ and alleviates the considerable volume shrinkage. A transmission electron microscopy (TEM) image in FIG. 1A reveals the high uniformity of the magnetic rods (for example, 322 nm by 70 nm). The magnetic assembly was performed by simply sitting a rod dispersion above a permanent magnet with a field strength of 150 mT.

Figures 1A, 1B, 1C, 1D, 1E, 1F, 1G, 1H, 1I:
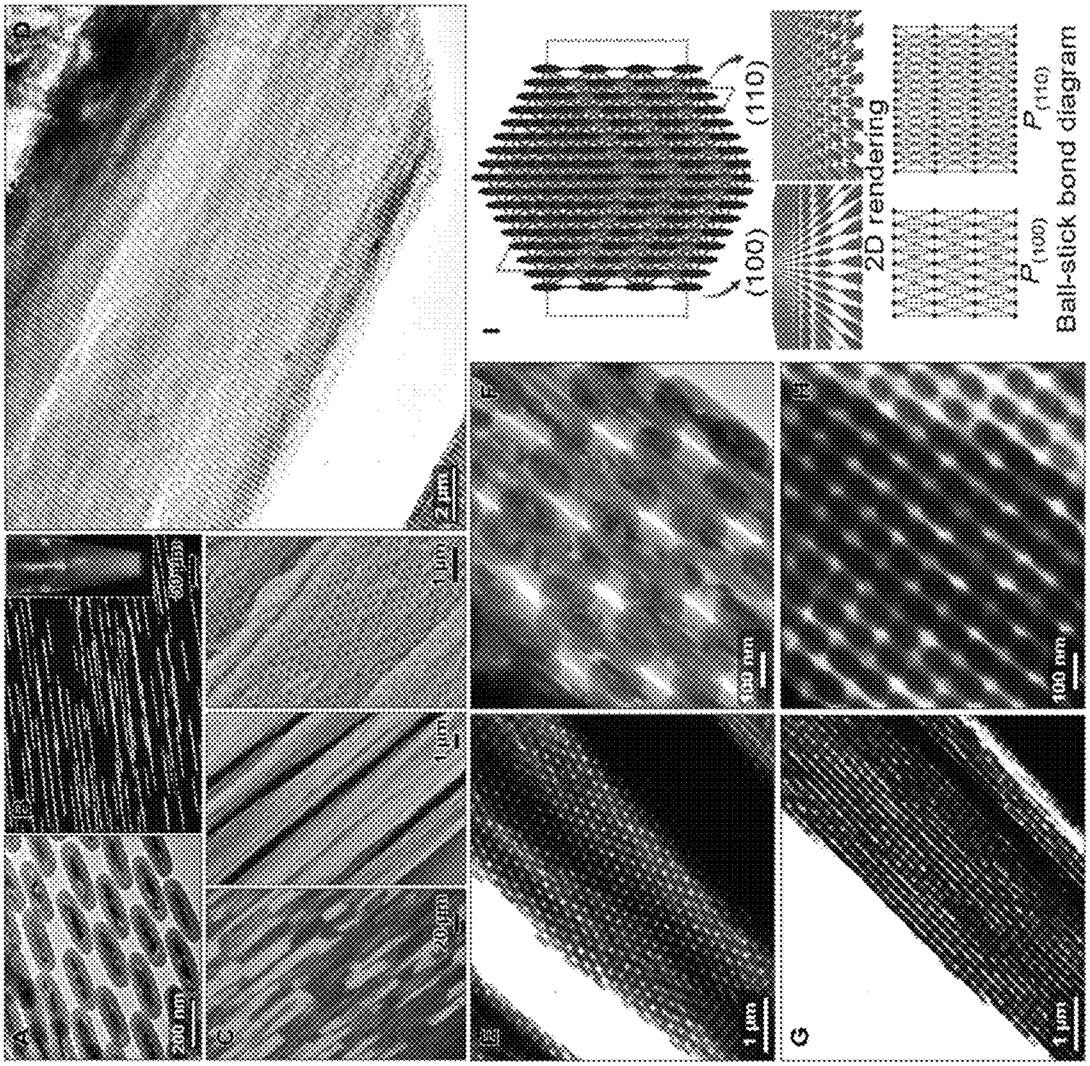

As shown in FIGS. 1B and 1C, stripe-like, green crystals formed. The scanning electron microscopy (SEM) image in FIG. 1C reveals that the magnetic nanorods are packed into a centered rectangular lattice on the crystal surface. The apparent orthogonality and different periodicity between transverse and longitudinal directions demonstrate the reduced symmetry of the crystals and exclude any triclinic, monoclinic, or cubic crystal systems. These observations suggest a few possible Bravais lattices, including body-centered orthorhombic, face-centered orthorhombic, and bct structures.

The silica fixation allows the colloidal crystals to be transformed into other colloid lattices by postassembly wet chemical processes. For example, selectively etching away $Fe_3O_4$ yields crystals of $SiO_2$ shells (FIG. 1D). In a two-dimensional (2D) projection, the contact joints between neighboring rods form high-density areas (dark regions in the 2D projection) separated by low-density, low-contrast domains. The projection of the assembled crystals along different crystallographic directions produced characteristic 2D TEM images, with two typical lattices being observed, rectangular phase (FIGS. 1E and 2F) and centered rectangular phase (FIGS. 1G and 1H). In FIG. 1E, the periodic empty spaces indicate that the rods are in hard contact but not closely packed. Crystals sharing this characteristic projection have identical transverse periodicity. These observations approve that the assembled structures are bct crystals because the hard contact between neighboring rods and the same transverse periodicity do not support the different interplanar spacing of (100) and (010) facets in orthorhombic crystals. A high-magnification image of the same area reveals overlaps of rod ends, creating defined joints and interconnected nanometer poles (FIG. 1F). As shown in FIGS. 1G and 1H, layer-by-layer stacking of crystal planes with apparent periodic nodes due to the partial rod overlap was observed. The projection of rod packing along this crystallographic direction is a rectangular 2D lattice. The arrangements of rods in the two typical planes are illustrated in the 2D rendering (FIG. 1I). The rods packing in (110) facets are consistent with the SEM images in FIG. 1C. The projection patterns (ball-stick bond diagram in FIG. 11) of (100) and (110) facets are consistent with TEM images in FIG. 1 (E and F), respectively.

Figures 2A, 2B, 2C, 2D, 2E, 2F, 2G, 2H:
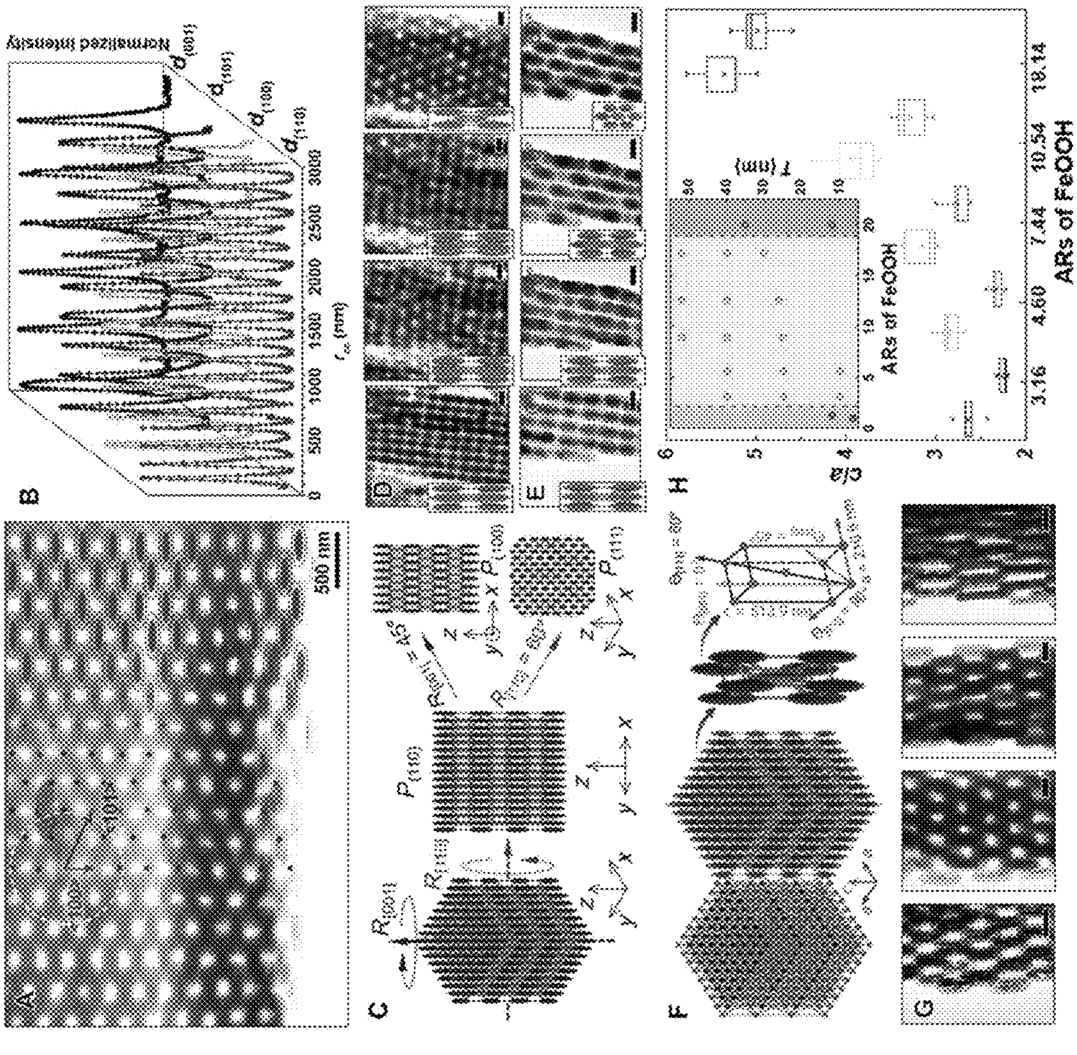

The rod positions in the crystals are identified and mapped in FIG. 2A. Their radical distribution ($r_{cc}$) in FIG. 2B demonstrates the excellent orders and defines the lattice spacing (d) of (110), (100), (101), and (001) facets. The 3D rod arrangement and the crystal rotational symmetry were systematically studied by electron tomography (movie Si). In FIG. 2C, a projection of (110) facets, $P_{(110)}$ was started, and acquired TEM images by continuously rotating crystals along [001] and [110] crystallographic directions, denoted as $R_{[001]}$ and $R_{[110]}$, respectively. The initial $P_{(110)}$ exhibits a layer-by-layer structure with a centered rectangular rod packing in (110) facets (FIG. 2D). When $R_{[001]}$=45°, a gradual evolution to $P_{(100)}$, with rectangular rod arrangements in (100) facets was observed. In $R_{[110]}$, the initial $P_{(100)}$ transforms to $P_{(111)}$ when the tilting angle increased to 60°, leading to a rectangular out-of-plane topography of rods (FIG. 2E). A 3D rendering model and ball-stick bond diagram are illustrated in FIG. 2F. In a unit cell, eight rods occupy the vertex sites, with one in the center, forming a bct lattice. Its length along the a and c axes is 210.6 and 513.9 nm, respectively. The angle between [111] and [110] is 30°. Using nanorods with different sizes and silica thicknesses, several bct colloidal crystals were obtained with tunable critical angles, lattice constants, and packing densities. In FIG. 2G, projections of (100) crystal facets are obtained with rod aspect ratio increasing from 2.25 to 18.5. Because of the dipole-dipole attractions, isotropic nanospheres were assembled into 1D nanochains. In the phase diagram (FIG. 2H, inset), long nanorods (aspect ratio, greater than (>) 20) self-assembled into disordered fibers largely because of the segregation of magnetic cores during reduction.

For $Fe_3O_4$@$SiO_2$ colloids with abundant surface charges, the electrostatic repulsion is a major counterforce to the magnetic attraction. Its classic use involves the multipolar expansion of an analytical equation, whose direction is mainly along the connecting line of interacting colloids. The monopole approximation is operational for isotropic, homogeneously charged spheres or anisotropic colloids with considerably large separation. As colloids approach, their morphological anisotropy becomes more effective. In accordance with an embodiment, a finite element analysis points out that the electrostatic repulsion is highly dependent on interparticle separation and that, in closely packed assemblies, it gradually approaches the surface normal of interacting rods. At thermodynamic equilibrium, the tangent component of the magnetic attraction is expected to vanish to avoid any relative translational shifts between nanorods, and the normal component is balanced by the electrostatic and steric repulsion.

Figures 3A, 3B, 3C, 3D, 3E, 3F:
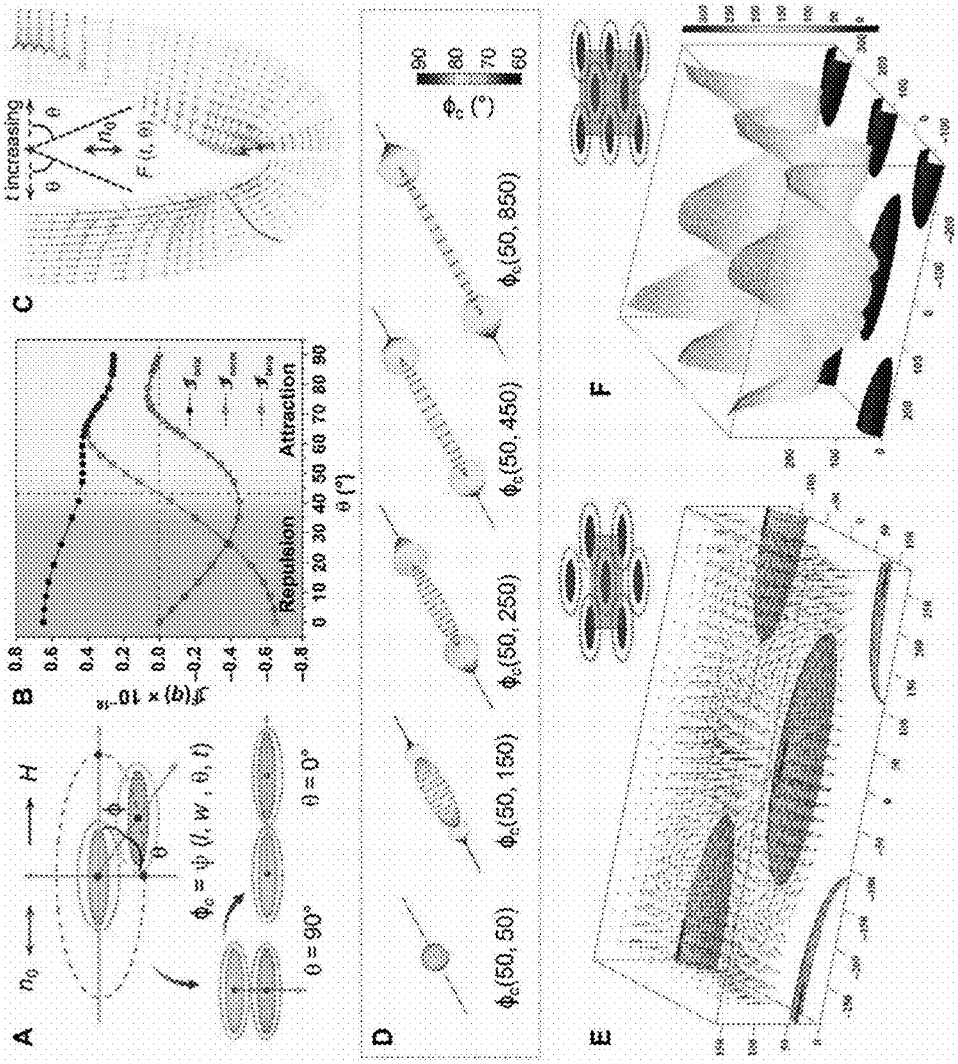
FIGS. 3A-3F illustrates assembly mechanism and force dynamics, wherein FIG. 3A are schematics showing the geometry for calculating the pair interaction between two nanorods under a horizontal magnetic field.

For understanding the force dynamics, one nanorod (in red color in FIG. 3A) is continuously swept along a defined trajectory in hard contact with a primary rod (in blue color). The magnetic force between them is dependent on silica thickness (t) and azimuth angle (θ). To identify the critical angles (e) along which interacting rods thermodynamically equilibrate, the overall magnetic force was decomposed into tangent ($F_{tang}$) and normal components ($F_{norm}$) In FIG. 3B, $F_{norm}$ changes from negative to positive values at 0=43°, which defines the repulsion and attraction domains, respectively. In the attraction regime, a critical point was specified at $F_{tang}$=0, where the magnetic attraction is along the surface normal. For 50-nm silica shells, the theoretical to is 68.1°, and its good agreement with the measured value of 63.5° from TEM images appreciates the reasonable accuracy of this simple calculation. The normal component in FIG. 3C (right) demonstrates the presence of the two attractive poles and the repulsive center, with their boundary shifting to small θ regions as silica thickness increased from 5 nm to 50 nm. It was observed the first decrease and then increase in to in the attractive domain (dashed blue line in FIG. 3C, left). To understand the deterministic role of aspect ratios, $\phi_c$ was analyzed for different magnetic rods and map their $\phi_c$ in a 3D surface in FIG. 3D. For isotropic nanospheres, $\phi_c$ remains 900 due to the dipole-dipole attraction, producing 1D chains with end-on attachment. Anisotropic nanorods favor offset packing with a defined $\phi_c$, which lastly degenerate to 90° as the $SiO_2$ thickness increases. The $\phi_c$ increased as aspect ratios because of rod elongation.

The offset binding between two rods initiated the nucleation of bct crystals as neighboring rods assemble at preferential crystalline sites along a predicted critical angle. It likely breaks the lateral symmetry of rods, creating a few preferred sites for rod deposition. The crystal growth features preferential in-plane rod tessellation in (110) facets, as evidenced by contrast differences in TEM images; the uniform contrast of TEM images along <110> projection implies even, sequent rod packing in the exposed (110) facets. Along <100> projections, a contrasting gradient implies a gradual decrease in crystal thickness from crystal center to edge. These observations suggest a defined rectangular cross section of bct crystal grains and the preferential in-plane rod packing in (110) facets. While the critical angle analysis demonstrates the offset packing of interacting nanorods, the formation of 3D tetragonal crystals requires higher-dimensional analysis of the assembly dynamics. The force computation was extended to a 3D model. The force field in FIG. 3E suggests a strong repulsion (red arrows) when the rod overlaps the bottom ones. A gradual shift to a strong attraction was observed when the rod moves to positions above cavities (blue arrows). In the magnetic potential landscape (FIG. 3F), periodic bonding sites above bottom cavities were recognized due to the localized low magnetic potential. There exist four active sites above and below each rod in the 2D sheet, resulting in eight bonded rods shared by its neighbors.

Figures 4A, 4B, 4C, 4D, 4E, 4F:
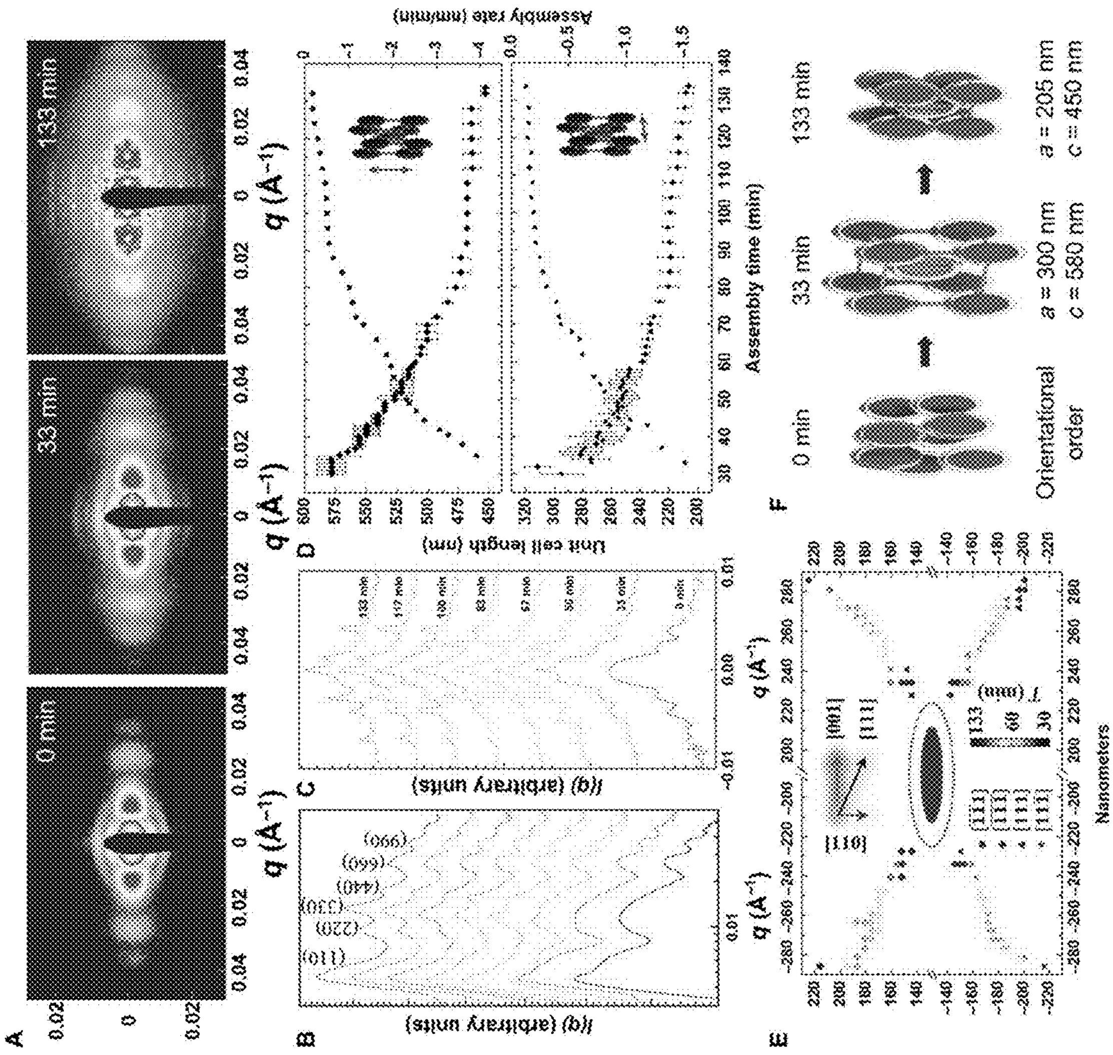

To resolve the assembly kinetics, the crystallization was analyzed by in situ synchrotron-based small-angle x-ray scattering (SAXS). The representative 2D SAXS patterns are shown in FIG. 4A. At 0 min, the anisotropic scattering pattern implies the liquid crystal phase of rods with only orientational orders and parallel alignment to a vertical magnetic field. At 33 min, a defined rectangular diffraction pattern appeared as nanorods began to crystalize, which is the reciprocal lattice of {110} facets. The high-order diffraction peaks confirm the perfect structures of the bct crystals. For example, the linear profiles in FIGS. 4B (horizontal) and C (vertical) show a ninth diffraction of {110} facets and fifth diffraction of {001} facets, respectively. FIG. 4D represents a time-dependent contraction of the lattice under external magnetic fields with exponential superlattice densification. The lattice contraction rate along both the a and c directions was initially at approximately 4 nm/min and slowed down when approaching thermodynamic equilibrium at approximately 90 min. The considerably slow assembly kinetics provide rods with sufficient spatiotemporal degrees of freedom to anneal out defects. FIG. 4E shows the evolution of local rod position along <111> crystallographic directions, indicating nearly linear spatial lattice contraction. The overall magnetic assembly was compiled and depicted in FIG. 4F with lattice shrinkage of 31.7 and 22.4% for the a and c axes, respectively.

Figures 5A, 5B, 5C, 5D, 5E:
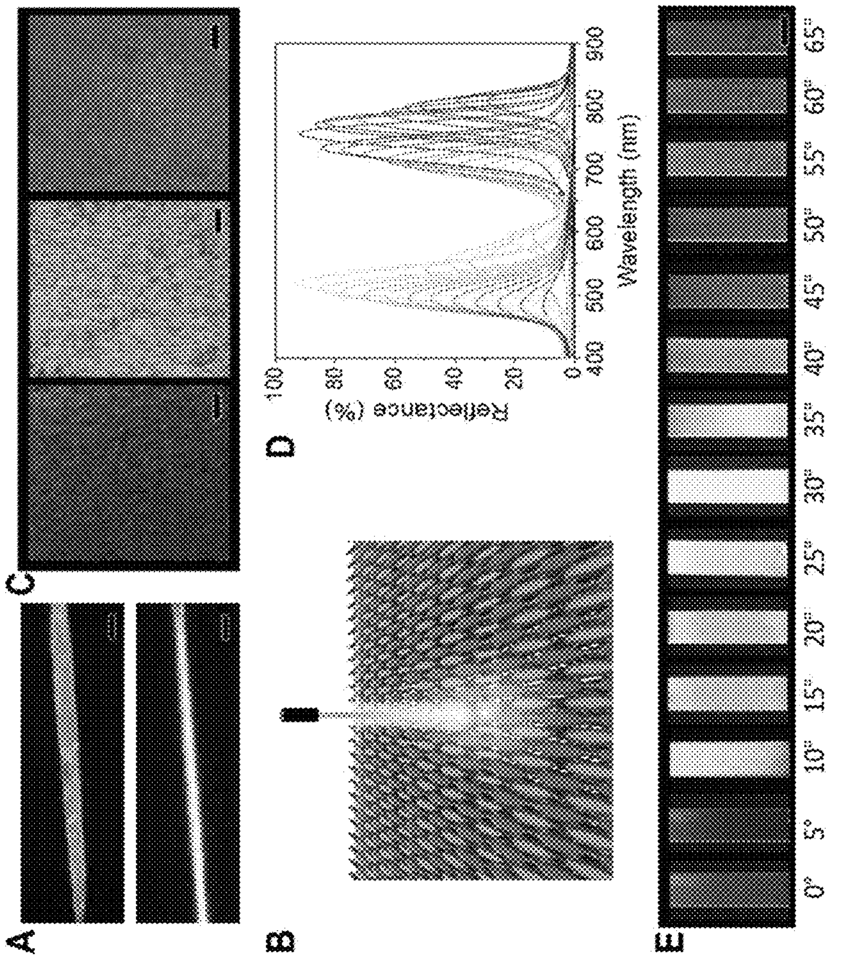

The bct crystals exhibit brilliant structural colors that are dependent on crystal orientation. In the dark-field optical microscopy images in FIG. 5A, structural colors diffracted from two types of facets: red from {100} and green from {110} facets were observed. The uniform structural colors elucidate the good crystallinity of the superstructures. The incident light was kept vertical along the crystal surface for measuring the angle-dependent optical properties (FIG. 5B). A horizontal magnetic field (0°) was applied, and spectra were measured by gradually changing the field to the vertical direction (90°). The three primary colors, blue, green, and red, can be observed at 0°, 20°, and 45°, respectively (FIG. 5C). The diffraction spectra in FIG. 5D further demonstrated a gradual red shift of the diffraction peaks due to the increasing periodicity when the crystal orientation increased to 90°. Their diffraction could cover the whole visible range from blue to cyan, green, yellow, orange, and, lastly, red by simply changing the magnetic field directions (FIG. 5E). A simple extension to different nanorods yields photonic crystals with tunable lattice constants and structure colors.

In accordance with an embodiment, the magnetic assembly of magnetite nanorods into tetragonal colloidal crystals is disclosed, which shows that the magnetic nanorods assemble along a size-dependent critical angle rather than the simple end-on attachment. The coupled shape and magnetic anisotropy in nanorods are responsible for the unconventional assembly manner and leads to the non-close-packed and hard-contact phase. The unique 3D tetragonal architectures and tunable, interconnected porosity provide a unique platform to modulate many chemical transformations and physical processes in energy conversion and optical devices. In addition, manipulating magnetic interactions of various anisotropically shaped nanostructures can break the limitation of the dense packing phase in the conventional entropy-dominated colloidal assembly systems, thereby opening the door to creating many complex colloidal crystals.

Materials and Methods

Synthesis of FeOOH Nanorods

The synthesis of nanorods with different aspect ratios was achieved by hydrolysis of $FeCl_3$ in an aqueous solution. The synthesis of FeOOH nanorods with small aspect ratios was carried out at room temperature without HCl. Because of relatively low temperature, it can take about 3 months for the formation of uniform FeOOH nanorods. To synthesize FeOOH nanorods with larger aspect ratios, HCl was added to the solution and raised the reaction temperature to 87° C. The reactions were kept at this temperature for 25.5 hours. Notably, this hydrolysis method can be easily scaled up without a significant change in size and aspect ratios. In the example of rods with aspect ratios of 4.6 (#F2), the total volume was 4 liters during room temperature hydrolysis. The concentration of $FeCl_3 \cdot 6H_2O$ is 0.04 M. During the reaction, the formed FeOOH nanorods precipitated to the bottom of the reaction containers. After removing the supernatants, the FeOOH nanorods were washed by water three times and then dispersed in 400 ml of water, which served as stock solutions.

PAA Modification

For polyacrylic acid (PAA) modification, 3 ml of the stock solution with a theoretical concentration of 90 mg/ml was added into 120 ml of PAA solution (43.2 mg) and stirred for 8 hours. Excess PAA was removed by centrifugation and washing with water three times. The FeOOH-PAA was further dispersed in 9 ml of water for $SiO_2$ coating.

$SiO_2$ Coating

In a coating process, 3 ml of FeOOH-PAA dispersion was added into a flask. The mixture was sonicated for 3 min to fully disperse the rods after 1 ml of ammonia solution was added. Then, 20 ml of ethanol was added to the dispersion. To control the thickness of silica, different volumes of tetraethyl orthosilicate (TEOS) were added to the mixture. In #F2, for example, 30 and 100 μl of TEOS were added to the mixture to achieve thicknesses of 20.5 and 44.2 nm, respectively, after a 30-min reaction. For thicker silica (approximately 72.8 nm), two batches of 130 μl of TEOS were added to the mixture each 30 min to prevent the formation of free silica nanoparticles. Half an hour after the second addition, the $FeOOH@SiO_2$ nanorods were precipitated by centrifugation and further washed three times by water.

High-Temperature Reduction

Magnetic nanorods were synthesized by reduction of $FeOOH@SiO_2$ nanorods in high-temperature calcination. $FeOOH@SiO_2$ nanorods were dried in crucibles and placed in a tubular furnace. The system was degassed for 10 min by forming gas (5% $H_2$ and 95% $N_2$). The reduction occurred at 360° C. for 2 hours. After cooling down to room temperature, the prepared $Fe_3O_4@SiO_2$ nanorods were fully dispersed in water by sonication and then washed by water three times. To further increase the surface charges and facilitate the fixation of colloidal crystals by silica coating, the $Fe_3O_4@SiO_2$ nanorods were modified by PAA (20 ml, 5 mg/ml) overnight.

Magnetic Assembly of Nanorods into Tetragonal Crystals

The assembly of colloidal crystals took place in aqueous dispersions of $Fe_3O_4@SiO_2$ nanorods. The dispersion was vertically placed above the center of a permanent magnet. For measuring the diffraction of the crystals, colloidal dispersion of $Fe_3O_4@SiO_2$ nanorods with an initial volume fraction of approximately 45% was sealed in a flat capillary. After assembling under the magnetic field, diffraction spectra were measured by continuously varying the directions of the applied magnetic field, and the pictures were also taken at the corresponding angles (FIG. 5C). To fix the assembled crystals, a small well of the 96-well plates were used as the container. In a typical reaction, 25 μl of an aqueous dispersion of $Fe_3O_4@SiO_2$ nanorods (volume fraction of approximately 45%) was transferred into the well. Three microliters of ammonia, 100 μl of ethanol, and 10 μl of TEOS were added in sequence. The mixture was sonicated for approximately 30 s and then placed above a permanent magnet. Additional 3 μl of ammonia was added after 10 min, and the reaction was continued for another 10 min. The precipitated crystals were washed with ethanol three times. During each cycle of washing, the crystals were collected by magnetic separation. Sonication and centrifugation would destroy the fixed crystal structures and therefore are not recommended. The crystals were stored in ethanol for further characterization. The positional order of the colloidal crystals decayed because long nanorods were synthesized in high-temperature hydrolysis, and the relatively fast crystal growth produces widely dispersed particles. According to the projection patterns, two types of crystal orientations were observed. Fixing neighboring rods by silica overcoating can impart considerable mechanical stability to the crystals, as demonstrated by twisting and bending the bct crystals under mechanical forces. Instead of being destroyed, the crystals deformed to release the internal strains, exhibiting interesting, combined states of colloid rigidness and mechanical elasticity.

Figures 6A, 6B, 6C, 6D, 6E:
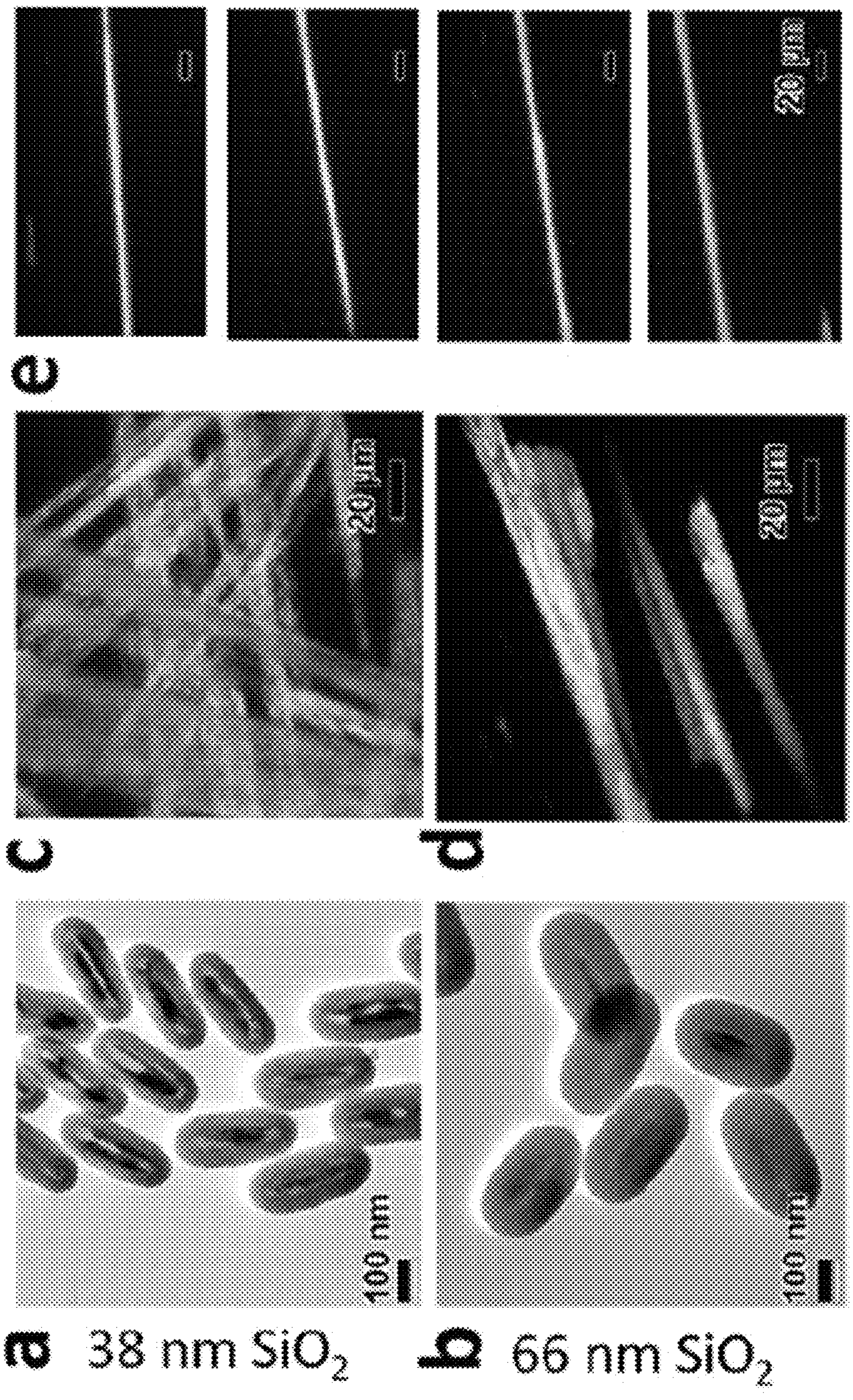
FIGS. 6A-6E are TEM images of $Fe_3O_4$@$SiO_2$ nanorods with 38-nm (FIG. 6A) and 66-nm silica (FIG. 6B), the dark-filed microscopic images of the photonic crystals in FIG. 6C and FIG. 6D are assembled from nanorods in FIG. 6A and FIG. 6B, respectively, and in FIG. 6E, the dark-filed microscopic images of the photonic crystals made from nanorods with different silica thicknesses, from top to bottom: 38 nm, 50 nm, 58 nm, and 66 nm.

In accordance with an embodiment, to prepare photonic pigments that are ready for practical applications, the assembled structures can be further fixed by silica coating as disclosed herein. In this process, a thin layer of silica will form on the assembled structures so that the micron-sized photonic crystals remain stable after removing the external magnetic field. To this end, nanorods with 38-nm (FIG. 6A) and 66-nm (FIG. 6B) silica shells can be used as building blocks, whose assembled photonic crystals are shown in FIG. 6C and FIG. 6D, respectively. Because the crystal orientation is random, they display multiple colors. For example, pigments made of thin nanorods predominantly diffract blue and green colors while pigments from thick nanorods have green and red colors. A close study demonstrates silica thickness-dependent redshifts of structural colors if the photonic pigments are uniformly aligned using an external magnetic field (FIG. 6E).

Figures 7A, 7B, 7C:
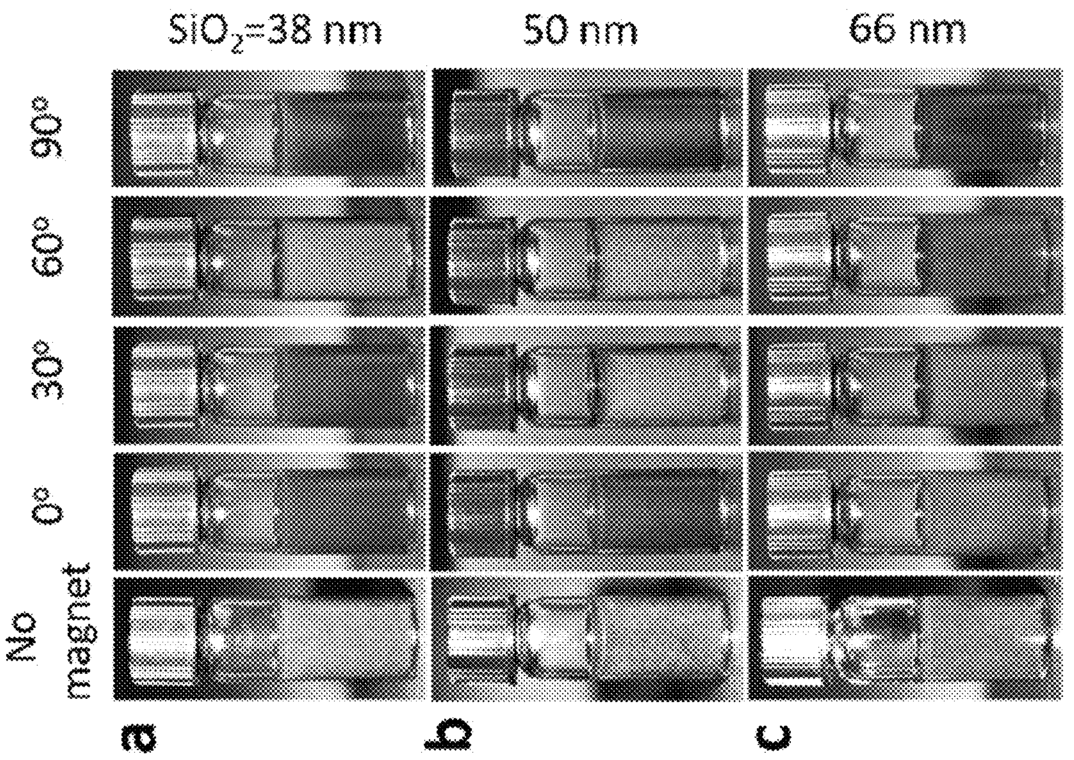
FIGS. 7A-7C are digital images of the photonic pigments prepared from nanorods with different silica thicknesses: 38 nm (FIG. 7A), 50 nm (FIG. 7B), and 66 nm (FIG. 7C), and wherein their structural colors can be tuned by changing the direction of an applied magnetic field, and the angles indicate the angle between the magnetic field direction and the vertical directions.

To systematically study the tunability of structural colors, three samples were prepared from nanorods with 38-nm, 50-nm, and 66-nm silica shells, whose optical performances under different magnetic fields are shown in FIG. 7A, FIG. 7B, and FIG. 7C, respectively. The photonic pigments display multiple colors under the absence of a magnetic field largely because of the random crystal orientation in different colloidal dispersions. Thanks to the preferred parallel alignment of magnetic nanorods to the applied magnetic field, the orientation of the photonic pigments can be readily, reversibly, and quickly controlled by a magnetic field. Specifically, increasing the angle between the field direction and the vertical direction leads to continuous redshift of the structural colors. For example, the structural colors of photonic pigments from thickest nanorods (FIG. 7C) change from blue to yellow, and red if the angle increases from 0° to 60°. At 90°, the diffraction occurs dig the longitudinal directions of the nanorods. Their large periodicity shifts the diffraction peak to near infrared region such that no obvious colors are observed. These results demonstrate the sensitive responses of the photonic pigments to an external magnetic field. In addition, the colors of the photonic pigments can be tuned over the whole visible range by simply changing the field directions, setting the stage ready for exploiting their practical applications.

Preparation and Magnetic Assembly of Nanorods

Preparation of FeOOH Nanorods

The synthesis of nanorods with different aspect ratios can be achieved by hydrolysis of $FeCl_3$ in aqueous solution. Notably, this hydrolysis method can be rather easily scaled up without significant change in size and aspect ratios. In accordance with an embodiment, the concentration of $FeCl_3 \cdot 6H_2O$ is 0.02M and 0.04M for samples shown in FIG. 8A and FIG. 8B, respectively. The concentration of $FeCl_3 \cdot 6H_2O$ is 0.1M for other samples. Samples in FIG. 8A and FIG. 8B were prepared by aging the corresponding $FeCl_3$ $6H_2O$ solution at room temperature for 3 months. For other samples, proper amount of HCl is added to the reaction. The final HCl concentrations for samples in FIGS. 8C, 8D, 8E, and 8F are 0.02 M, 0.03 M, 0.04 M, and 0.06 M, respectively. The reactions occurred at 87° C. for 25.5 hours. During the reaction, the formed FeOOH nanorods precipitate at the bottom of the reaction containers. After removing the supernatants, the FeOOH nanorods were washed by water three times and then dispersed in 400 mL of water, which serves as stock solutions.

For PAA modification, 3 mL of the stock solution with theoretical concentration of 90 mg/mL is added into 120 mL of PAA solution (43.2 mg) and stirred for 8 hours. Excess PAA is removed by centrifugation and washing with water for three time. The FeOOH-PAA is further dispersed in 9 mL of water for $SiO_2$ coating.

In a coating process, 3 mL of FeOOH-PAA dispersion is added into a flask. The mixture was sonicated for 3 min to fully disperse the rods after 1 mL of ammonia solution is added. Then, 20 mL of ethanol is added to the dispersion. To control the thickness of silica, different volumes of TEOS are added to the mixture. After half an hour, the FeOOH@$SiO_2$ nanorods are precipitated by centrifugation and further washed three times by water.

Magnetic nanorods are synthesized by reduction of FeOOH@$SiO_2$ nanorods in high-temperature calcination. FeOOH@$SiO_2$ nanorods are dried in crucibles and placed in tubular furnace. The system is de-gassed for 10 min by forming gas (5% $H_2$ and 95% $N_2$). The reduction occurred at 360° C. for 2 hours. After cooling down to room temperature, the prepared $Fe_3O_4$@$SiO_2$ nanorods are fully dispersed in water by sonication and then washed by water for three times. To further increase the surface charges and facilitate the fixation of colloidal crystals by silica coating, the $Fe_3O_4$@$SiO_2$ nanorods are modified by PAA (20 mL, 5 mg/mL) overnight.

Magnetic Assembly and Fixation of the Photonic Pigments

Figures 8A, 8B, 8C, 8D, 8E, 8F:
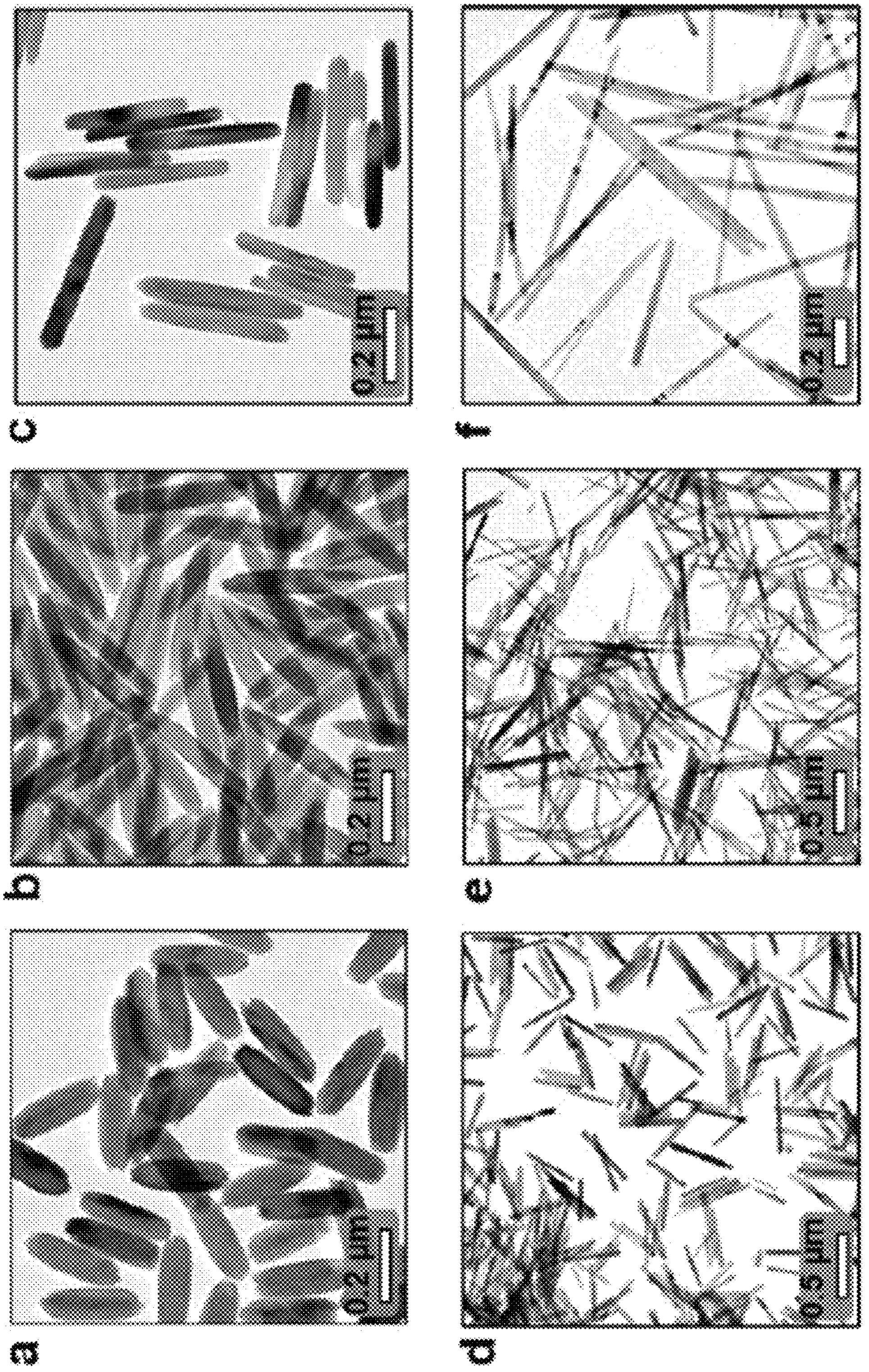
FIGS. 8A-8E are TEM images of FeOOH nanorods with different sizes and aspect ratios: 288 nm×91 nm (FIG. 8A); 322 nm×70 nm (FIG. 8B); 381 nm×52 nm (FIG. 8C); 434 nm×42 nm (FIG. 8D); 600 nm×33 nm (FIG. 8E); and 819 nm×27 nm (FIG. 8F).
Figures 9A, 9B, 9C, 9D:
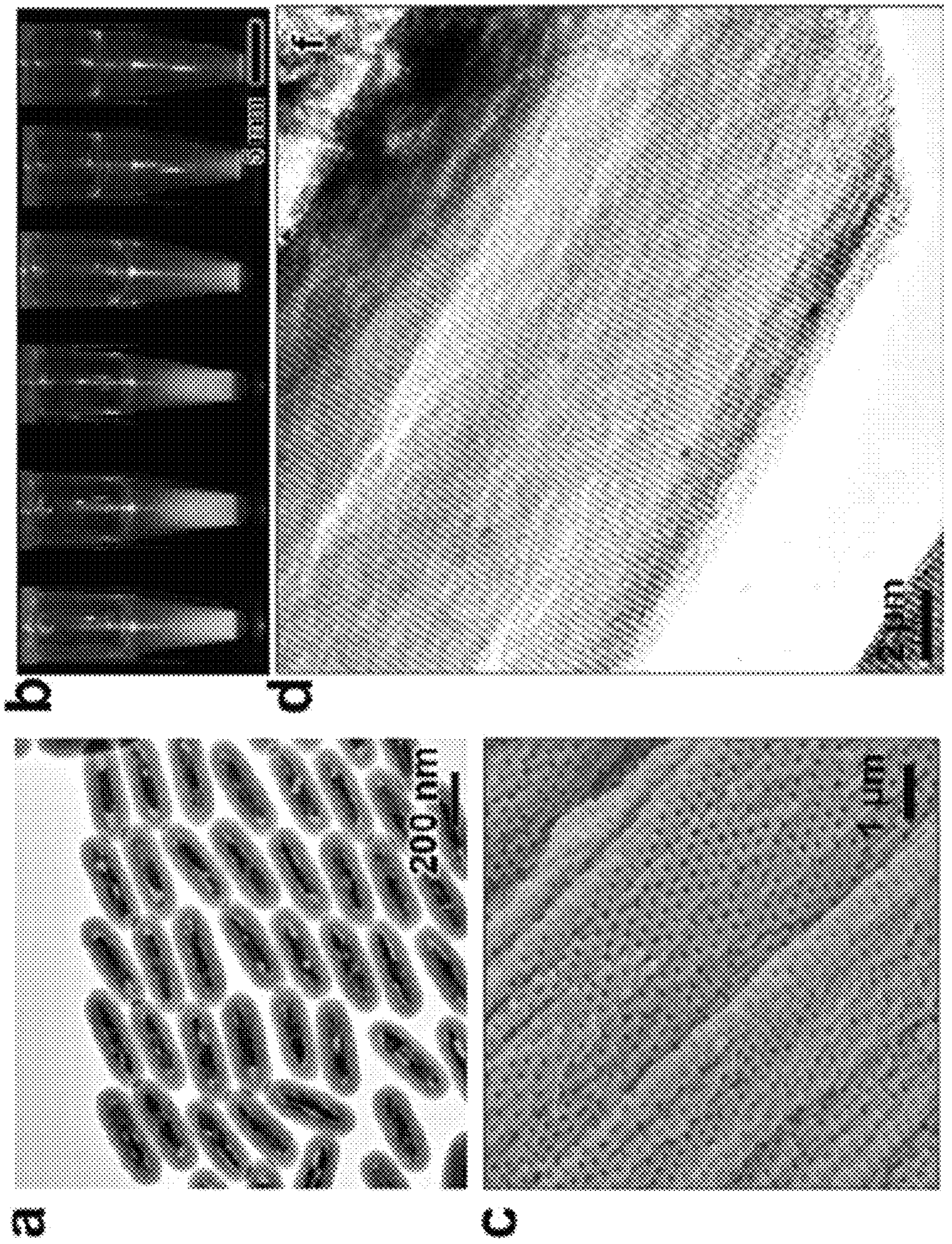
FIG. 9A is a TEM image of $Fe_3O_4$@$SiO_2$ nanorods.
FIG. 9B are digital images of a rod dispersion in a vertical magnetic field.
FIG. 9C is an SEM image showing the characteristic packing of rods in the crystal surface.
FIG. 9D is a TEM image of assembled hollow $SiO_2$ ellipsoids formed by post-assembly etching of $Fe_3O_4$ core.

Using the nanorods shown in FIG. 8B as starting materials, the final magnetic nanorods are presented in FIG. 9A. The magnetic nanorods are very uniform. The protection of silica shells retains the initial rod shape during the reduction. The assembly of colloidal crystals is performed in aqueous dispersions of $Fe_3 04$@$SiO_2$ nanorods. The dispersion is vertically placed above the center of a permanent magnet. In order to fix the assembled crystals, TEOS is introduced during the magnetic assembly. In a typical reaction, 25 μL of aqueous dispersion of $Fe_3 04$@$SiO_2$ nanorods (volume fraction of approximately 45%) is transferred into a well. 3 μL of ammonia, 100 μL of ethanol and 10 μL of TEOS are added in sequence. The mixture is sonicated for approximately 30 seconds and then placed above a permanent magnet (FIG. 9B). Additional 3 μL of ammonia is added after 10 min and the reaction is continued for another 10 min. The precipitated crystals are washed by ethanol for three times. The SEM image in FIG. 9C demonstrates the excellent order in the assembled structures. To study the long-range order of the crystals, $Fe_3O_4$ cores are etched, producing crystals of silica shells. A TEM image is shown in FIG. 9D and demonstrates the relatively good crystallinity of the large photonic crystals.

Extension of the Magnetic Assembly Strategy to Other Building Blocks

The disclosure uses $Fe_3O_4$@$SiO_2$ nanorods as an example to illustrate the magnetic assembly and preparation of the photonic pigments. Generally, the magnetic assembly strategy and preparation of photonic pigments are versatile and universal to magnetic nanorods, which are independent on the chemical component of the core and shell materials, rod size and aspect ratio. For example, magnetic nanorods with different sizes and aspect ratios can be prepared using the FeOOH nanorods in FIGS. 8A-8F as starting materials. In practice, the phase of the core after reduction can be controlled, leading to optional Fe, $Fe_3O_4$, and $\gamma$-$Fe_2O_3$ nanorods. Also, the silica shells can be replaced by other materials, such as $TiO_2$ and polymers. Previous studies have demonstrated that resorcinol-formaldehyde (RF) resins can be readily coated on FeOOH nanorods and magnetic nanoparticles, which serve as a promising alternative to $SiO_2$. These magnetic nanorods can be used to prepare the photonic pigments by the same procedures presented in this disclosure, whose structural colors are dependent on the rod sizes and crystal orientation. In addition, magnetic nanorods prepared by different methods can also be used as building blocks. A few examples include Ni nanorods, $NiFe_2O_4$ nanorods, $\gamma$-$Fe_2O_3$ nanorods, and Co nanorods.

In accordance with an embodiment, the photonic pigments can be sealed in durable, customizable package so that they can be readily used in various practical applications, for example, such as anti-counterfeiting and decoration. In addition, the photonic pigments can be used in sensing detection based on the unique porous structures and responsive optical properties.

The detailed description above describes embodiments of a method and system for multicolor photonic pigments from magnetically assembled nanorods arrays. The invention is not limited, however, to the precise embodiments and variations described. Various changes, modifications and equivalents may occur to one skilled in the art without departing from the spirit and scope of the invention as defined in the accompanying claims. It is expressly intended that all such changes, modifications and equivalents which fall within the scope of the claims are embraced by the claims.

What is claimed is:

1. Photonic pigments comprising:

a plurality of magnetic nanorods assembled into tetragonal colloidal crystals;

a layer of nanomaterial on the plurality of magnetic nanorods assembled into the tetragonal colloidal crystals, the layer of nanomaterial configured to fix the plurality of magnetic nanorods assembled into the tetragonal colloidal crystals into a structural color; and wherein the layer of nanomaterial is selected from a group consisting of silica, $TiO_2$, resorcinol-formaldehyde (RF) resins, and polymers.

2. The photonic pigments according to claim 1, wherein the layer of nanomaterial is silica, the silica having a thickness of 1 nanometer to 100 nanometers.

3. The photonic pigments according to claim 1, wherein the plurality of magnetic nanorods is selected from a group consisting of Fe nanorods, $Fe_3O_4$ nanorods, FeOOH nanorods, $\gamma$-$Fe_2O_3$ nanorods, Ni nanorods, $NiFe_2$04 nanorods, and Co nanorods.

4. The photonic pigments according to claim 1, wherein the plurality of magnetic nanorods is $Fe_3O_4$ nanorods.

5. The photonic pigments according to claim 4, further comprising:

a nano-layer of silica on the plurality of $Fe_3O_4$ nanorods assembled into the tetragonal colloidal crystals.

6. The photonic pigments according to claim 1, wherein the plurality of magnetic nanorods assembled into the tetragonal colloidal crystals are tunable to one or more visible spectrums.

7. The photonic pigments according to claim 1, wherein the photonic pigments are used in one or more of a photonic display, an anti-counterfeiting device, a decoration device, and colorimetric sensor.

8. A method of forming photonic pigments with tunable color responses, the method comprising:

assembling a plurality of magnetic nanorods into tetragonal colloidal crystals;

fixing the plurality of magnetic nanorods assembled into the tetragonal colloidal crystals into a structural color by adding a layer of nanomaterial on the plurality of magnetic nanorods assembled into the tetragonal colloidal crystals; and wherein selecting the layer of nanomaterial from a group consisting of silica, $TiO_2$, resorcinol-formaldehyde (RF) resins, and polymers.

9. The method according to claim 8, wherein the layer of nanomaterial is silica, the silica having a thickness of 1 nanometer to 100 nanometers.

10. The method according to claim 8, further comprising:

selecting the plurality of magnetic nanorods from a group consisting of Fe nanorods, $Fe_3O_4$ nanorods, FeOOH nanorods, $\gamma$-$Fe_2O_3$ nanorods, Ni nanorods, $NiFe_2O_4$ nanorods, and Co nanorods.

11. The method according to claim 8, wherein the plurality of magnetic nanorods is $Fe_3O_4$ nanorods.

12. The method according to claim 11, further comprising:

forming a nano-layer of silica on the plurality of $Fe_3O_4$ nanorods assembled into the tetragonal colloidal crystals.

13. The method according to claim 8, further comprising:

tuning the plurality of magnetic nanorods assembled into the tetragonal colloidal crystals to one or more visible spectrums with an external magnetic field.

14. The method according to claim 8, further comprising:

using the photonic pigments in one or more of a photonic display, an anti-counterfeiting device, a decoration device, and colorimetric sensor.

* * * * *